(12) United States Patent
Hitchcock et al.

(10) Patent No.: US 6,823,895 B2
(45) Date of Patent: Nov. 30, 2004

(54) MAGNETORHEOLOGICAL FLUID DEVICE

(75) Inventors: Gregory H. Hitchcock, Reno, NV (US); Faramarz Gordaninejad, Reno, NV (US)

(73) Assignee: The Board of Regents of the University and Community College System of Nevada on Behalf of the University of Nevada, Reno, NV (US)

( * ) Notice: Subject to any disclaimer, the term of this patent is extended or adjusted under 35 U.S.C. 154(b) by 171 days.

(21) Appl. No.: 10/160,950

(22) Filed: May 30, 2002

(65) Prior Publication Data
US 2002/0179145 A1 Dec. 5, 2002

Related U.S. Application Data
(60) Provisional application No. 60/295,312, filed on May 31, 2001.

(51) Int. Cl.$^7$ .................................................. F15C 1/04
(52) U.S. Cl. ...................... 137/827; 137/251.1; 137/909
(58) Field of Search .............................. 137/251.1, 827, 137/909; 188/267.2

(56) References Cited

U.S. PATENT DOCUMENTS

| | | |
|---|---|---|
| 2,820,471 A | 7/1953 | Crowell ....................... 137/251 |
| 2,667,237 A | 1/1954 | Rabinow ...................... 188/88 |
| 2,670,749 A | 3/1954 | Germer ........................... 137/1 |
| 2,692,582 A | 10/1954 | Curci et al. .................... 121/38 |
| 2,869,818 A | 1/1959 | Fleuret ........................ 251/137 |
| 3,010,471 A | 11/1961 | Gross .......................... 137/251 |
| 3,059,915 A | 10/1962 | Kemelhor ....................... 267/1 |
| 3,448,751 A | 6/1969 | Rosaen ....................... 137/81.5 |
| 3,485,254 A | 12/1969 | Ernst .......................... 137/807 |
| 3,587,613 A | 6/1971 | Mark et al. ................. 137/81.5 |
| 3,672,387 A | 6/1972 | Harris et al. ............... 137/81.5 |
| 3,970,112 A | 7/1976 | Bernard ....................... 137/807 |
| 4,840,112 A | 6/1989 | Bhadra et al. ................. 91/459 |
| 5,113,890 A | 5/1992 | Elizondo-Gonzalez et al. ............................ 137/13 |
| 5,158,109 A | 10/1992 | Hare, Sr. ................... 137/514.3 |
| 5,161,653 A | 11/1992 | Hare, Sr. ...................... 188/267 |
| 5,241,991 A | 9/1993 | Iorio et al. ................... 137/807 |
| 5,333,646 A | 8/1994 | Delot .......................... 137/827 |
| 5,353,839 A | 10/1994 | Kordonsky et al. ......... 137/806 |
| 5,362,027 A | 11/1994 | Champaigne et al. .. 251/129.01 |
| 5,377,721 A | 1/1995 | Kiyohiro et al. ............ 137/807 |
| 5,452,745 A | 9/1995 | Kordonsky et al. ......... 137/807 |
| 6,116,144 A | 9/2000 | Rosenfeldt et al. ........... 91/459 |
| 6,131,709 A | 10/2000 | Jolly et al. ............... 188/267.2 |
| 6,296,088 B1 | 10/2001 | Carlson ................... 188/267.2 |

OTHER PUBLICATIONS

G. Hitchcock et al., "A New By–Pass, Fail–Safe, Magneto–Rheological Fluid Damper", *SPIE*'s 9$^{th}$ Annual International Symposium on Smart Structures and Materials, Mar. 17–21, 2002.

G. Hitchcock et al., "Study of a new By–Pass Magneto–Rheological Fluid Damper", 3$^{rd}$ World Conference on Structural Control, Como, Italy, Apr. 7–12, 2002.

*Primary Examiner*—John Rivell
(74) *Attorney, Agent, or Firm*—Sierra Patent Group, Ltd.

(57) ABSTRACT

The disclosure describes a magnetorheological fluid control valve. The magnetorheological fluid control valve comprises an electromagnetic coil having a first end and a second end. A first arm is magnetically coupled to the first end of the electromagnetic coil. A second arm is magnetically coupled to the second end of the electromagnetic coil. The second arm has a passage. A ferromagnetic rod having a diameter less than that of the passage is disposed in the passage and magnetically coupled to the first and second arms. A first manifold is coupled to the second arm at one end of the passage. A second manifold is coupled between the second arm and the first arm at an end of the passage opposite the first manifold. A magnetorheological fluid is disposed in the passage.

18 Claims, 8 Drawing Sheets

MAGNETORHEOLOGICAL FLUID DEVICE

CROSS-RELATED

This application is a utility application claiming priority to an earlier filed U.S. Provisional Application No. 60/295,312, filed May 31, 2001.

FIELD OF THE INVENTION

The present disclosure relates to the fields of vibration control and energy dissipation through a field-controllable fluid device. Particularly the present disclosure relates to a magnetorheological fluid control valve.

BACKGROUND

Magnetorheological fluid-based control valves provide flow control by varying electrical current to an electromagnet that affects the apparent viscosity of the magnetorheological fluid (MRF). Increased electric current provides an increased magnetic field, which in turn, increases the apparent viscosity of the fluid. Therefore, the flow rate through the valve can be controlled.

A MRF consists of ferrous particles suspended in a carrier fluid. The rheological behavior of the fluid occurs under presence of a magnetic field where the ferrous particles polarize to a chain-like formation. The iron particles chain up through attraction in the direction of the magnetic flux and the strength of their attraction is directly related to the strength of the magnetic field. The rheology of MRF is capable of changing within milliseconds under a magnetic field. MRF based valves are ideal for semi-active control applications.

MRF valves can be used in variety of mechanical systems such as automotive, bicycle, and motorcycle shock absorber applications, where damping forces are controlled. An emerging application for MRF valved dampers, as protective devices, is in the area of energy mitigation for large structures, such as buildings and bridges under earthquake and/or severe storms. These damper applications along with basic flow control in any hydraulic system comprise the primary fields of use for the invention.

State-of-the-art in MRF valve technology relies on strict manufacturing tolerances and additional mechanical assembly features that limit the practical application for a broad use in hydraulic systems. Designs that require electromagnetic solenoid locations close to the MRF valve region can make manufacturing and assembly cost prohibitive and prone to maintenance complications. MRF valves that require additional springs, pistons, and seals present additional potential valve wear induced failures. The magnetic field conduction path should be designed to prevent the least leakage of magnetic field to valve components that are not directly related to the MRF valving location.

SUMMARY

The disclosure describes a magnetorheological fluid control valve. The magnetorheological fluid control valve comprises an electromagnetic coil having a first end and a second end. A first arm is magnetically coupled to the first end of the electromagnetic coil. A second arm is magnetically coupled to the second end of the electromagnetic coil. The second arm has a passage. A ferromagnetic rod having a diameter less than that of the passage is disposed in the passage and magnetically coupled to the first and second arms. A first manifold is coupled to the second arm at one end of the passage. A second manifold is coupled between the second arm and the first arm at an end of the passage opposite the first manifold. A magnetorheological fluid is disposed in the passage.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the present invention will readily suggest themselves to such skilled persons having the benefit of this disclosure.

Figure 1:
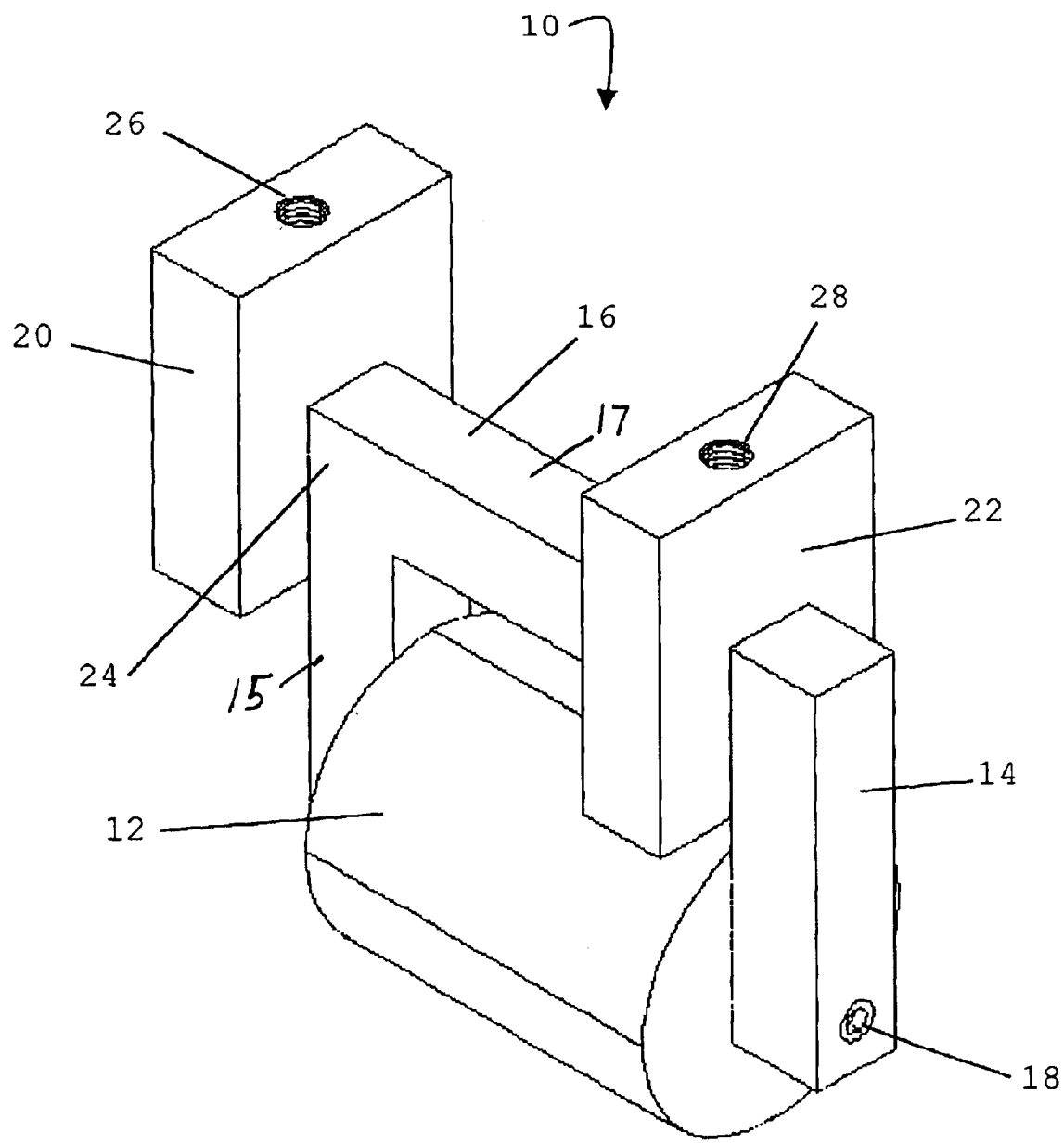
FIG. 1 is an isometric view of an exemplary embodiment of an MRF control valve.

Referring to FIG. 1, an isometric view illustrates an exemplary MRF control valve 10. The MRF control valve 10 includes an electromagnetic coil 12 that comprises an electrically energized coil of insulated wire that produces a magnetic field within the coil (see FIG. 3). The electromagnetic coil 12 is fastened between a first arm (magnet-support member) 14 and a second arm (magnet-support member) 16 by fasteners 18. The first arm 14 and second arm 16, are preferably formed from a ferrous material (ferromagnetic). In a preferred embodiment, the second arm 16 can be L-shaped including a first branch 15 and a second branch 17 perpendicular thereto. Also included are a first manifold 20 and a second manifold 22. The first manifold 20 and the second manifold 22 are preferably formed from a non-ferrous material. The first manifold 20 is coupled to second arm 16 at an elbow 24 of the second arm 16. The second manifold 22 is coupled between the first arm 14 and the second arm 16 at an end of the second arm distal from the elbow 24. A first aperture 26 is located in the first manifold 20 and a second aperture 28 is located in the second manifold 22. The first aperture 26 and the second aperture 28 can be threaded in preferred embodiments to receive fluid couplings (not shown).

Figure 2:
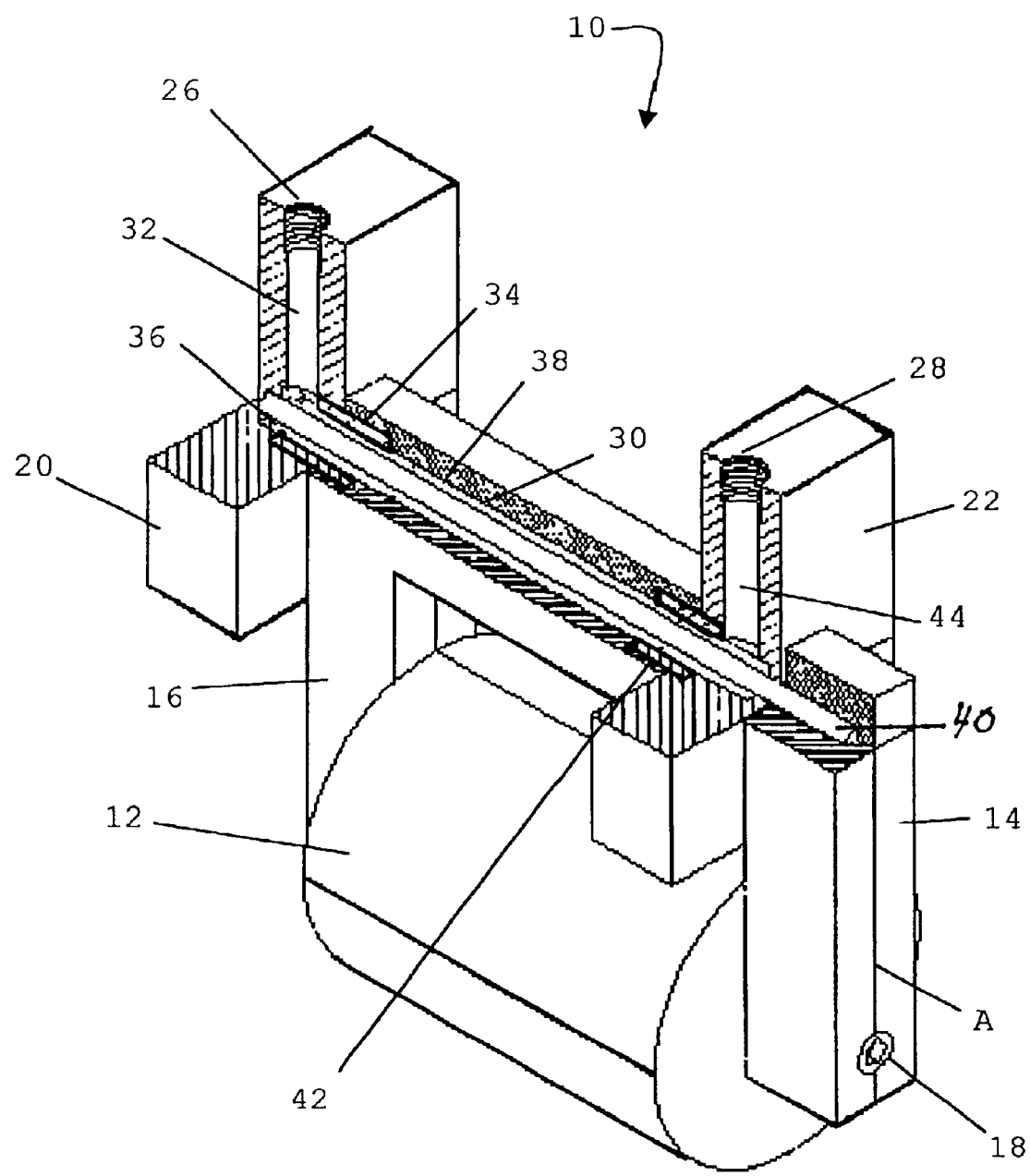
FIG. 2 is a partial section of an annular flow region in an isometric view.

Referring to FIG. 2 the control valve 10 is illustrated in a partial section. The partial section illustrates additional components of the control valve 10. The control valve 10 includes a flow region 30. The flow region 30 is defined beginning with the first aperture 26 into a first bore 32 formed in the first manifold 20. The flow region 30 extends from the first bore 32 through a first bushing 34 into an annular region 36. The first bushing 34 is fitted sealable between the first manifold 20 and the second arm 16 to fluidly seal the assembly. The annular region 36 is defined by a passage (duct) 38 formed through the second arm 16 and by an inner rod 40 disposed in the passage 38. The inner rod 40 extends into the first manifold 20 and opposite thereof into the first arm 14. Inner rod 40 is preferably formed from a ferrous material. The flow region 30 is further defined from the annular region 36 into a second bushing 42 into a second bore 44 formed in the second manifold 22. The second bushing 42 is sealably fitted between the second arm 16 and the second manifold 22 to fluidly seal the assembly. The flow region 30 facilitates MRF flow through the control valve 10 into and out of first aperture 26 and second aperture 28. MRF can also flow from the second aperture 28 to the first aperture 26.

Figure 3:
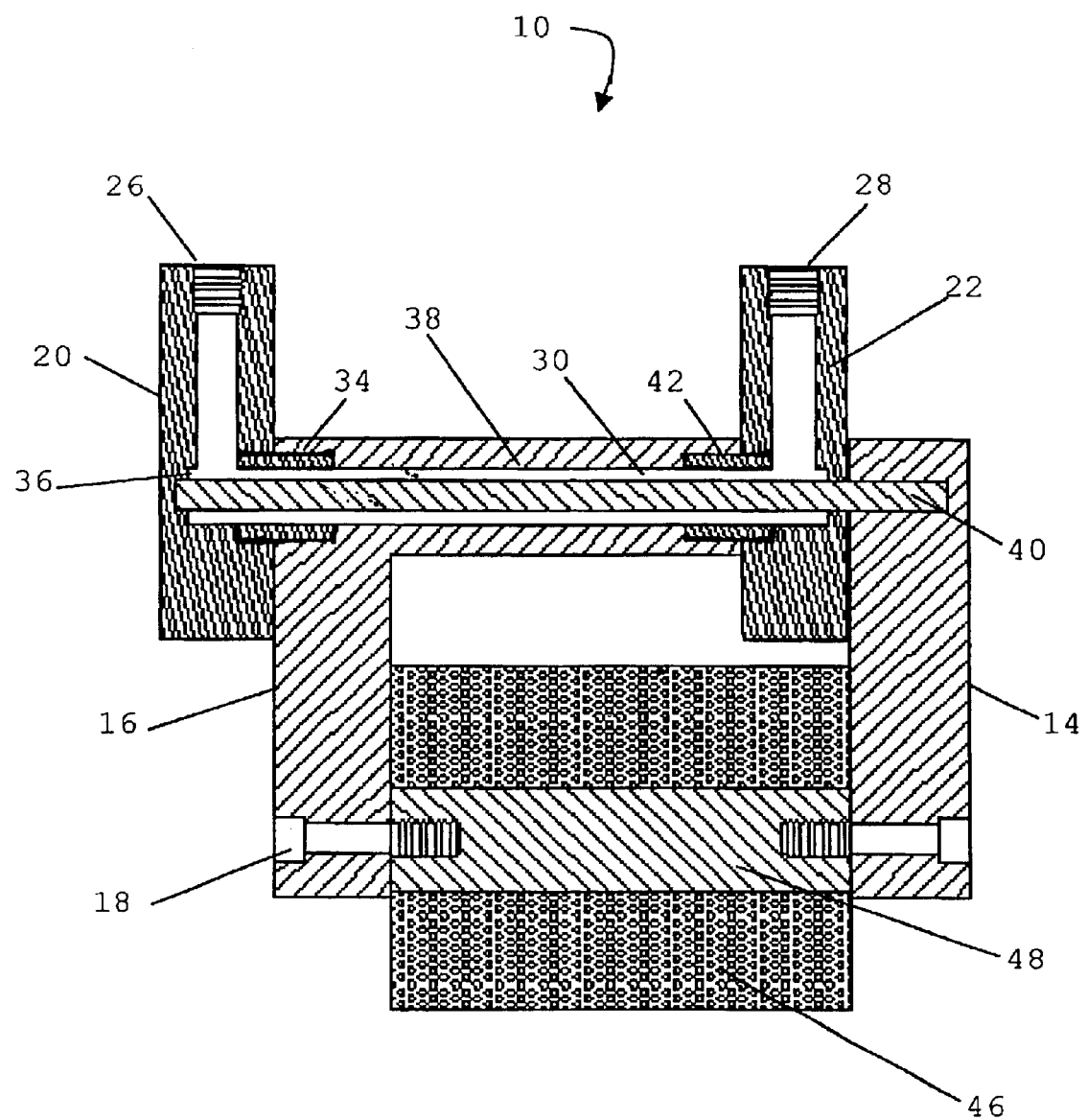
FIG. 3 is a cross section through mid-plane A of FIG. 2.

Referring to FIG. 3, the control valve 10 is illustrated in a cross section through a mid-plane "A" shown in FIG. 2. The electromagnetic coil 12 includes a coil of wire 46 encircled about a core 48. The core (or magnetic core) 48 is a material that can be magnetized, and is preferably formed from a ferrous material. The coil of wire 46 is electrically coupled to an electrical source (not shown) that provides electrical current through the coil of wire 46. Driving a current through the coil of wire 46 will magnetize the core 48, thus, creating a magnetic field. The magnetic field aligns the minute magnetic domains that are inherent in the ferromagnetic material of the core 48, and thus, magnetizes the core 48. The core 48 is magnetically coupled to the first arm 14 and the second arm 16. The inner rod 40 is magnetically coupled to the first arm 14. The inner rod 40 is magnetically isolated from the first manifold 20. The annular region 36 formed by the passage 38 and inner rod 40 defines a gap that magnetically isolates the inner rod 40 from the passage 38 of the second arm 16 when there is no MRF filling the annular region 36. When MRF fills the annular region 36, second arm 16 is magnetically coupled to the inner rod 40.

Figure 4:
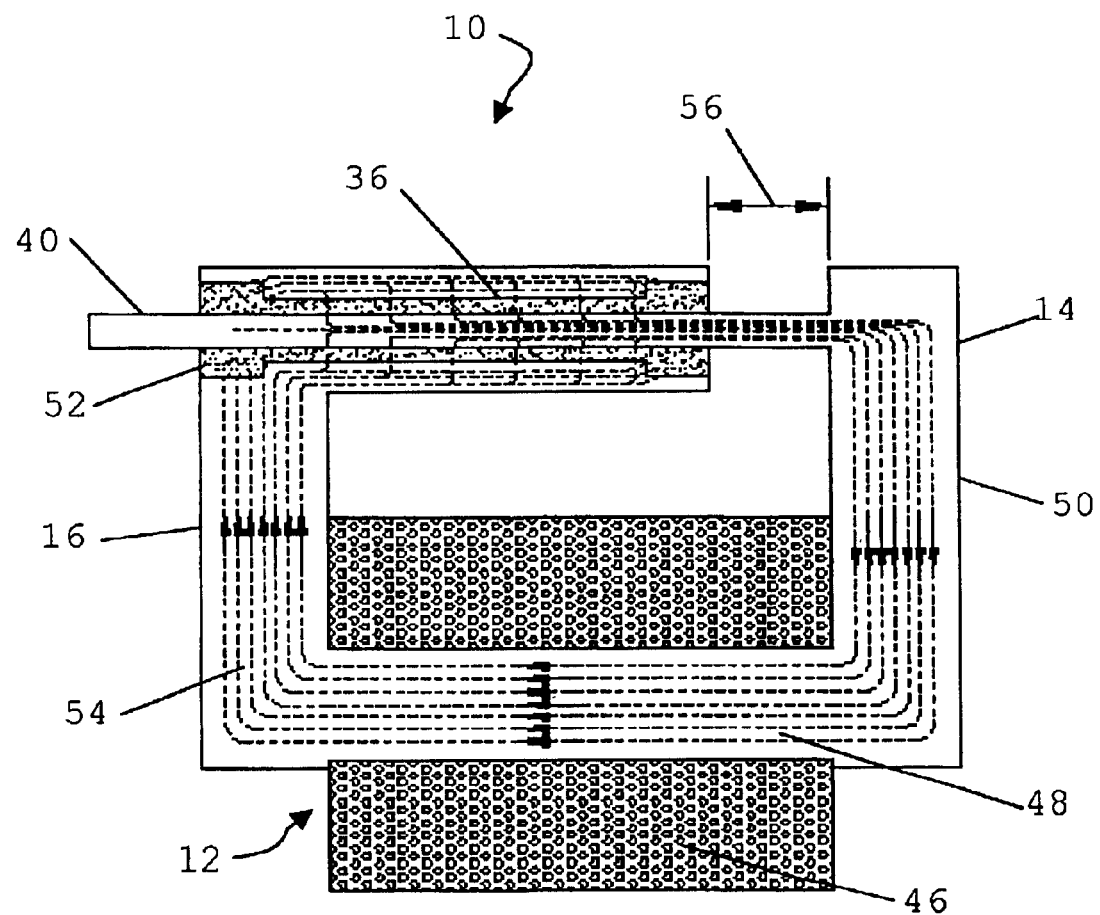
FIG. 4 is a diagram of a magnetic flux path through an exemplary embodiment of an MRF control valve.
Figure 5:
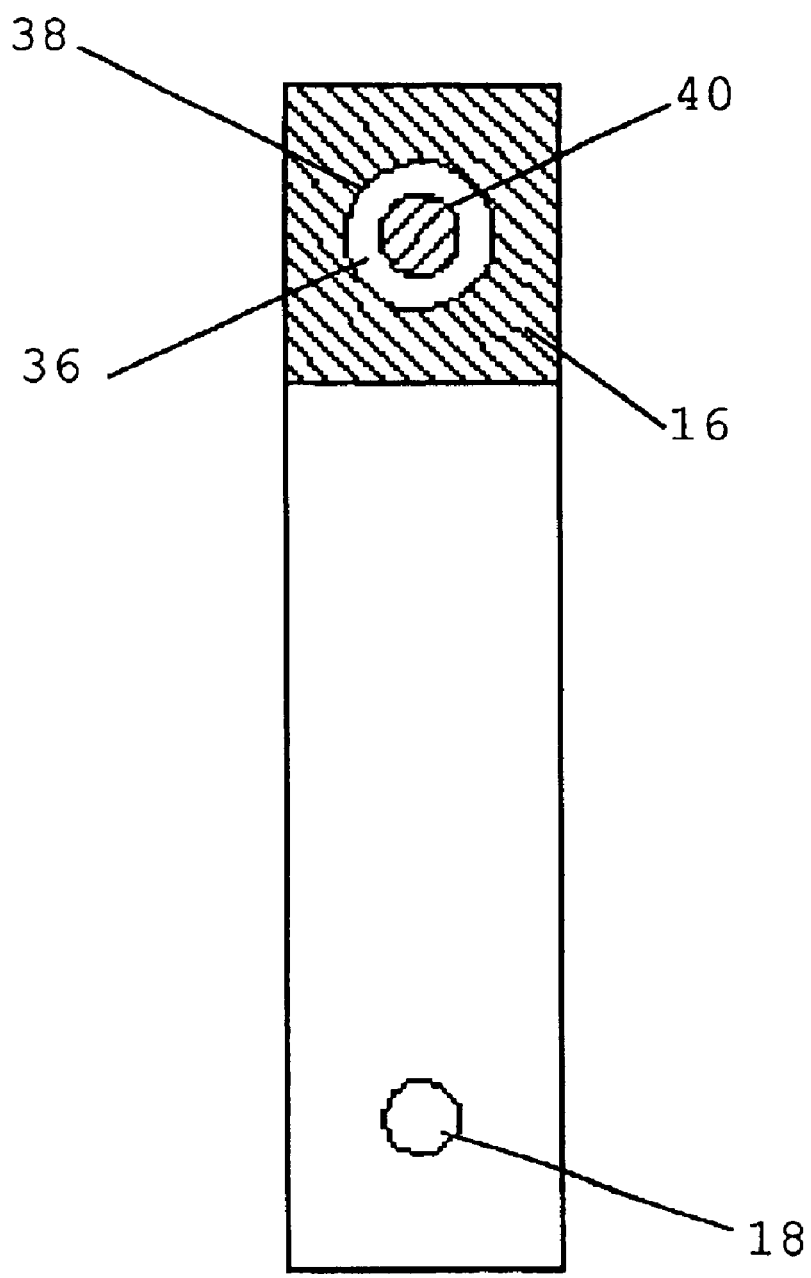
FIG. 5 is a cross section of the annular flow region along the long axis of the annular flow region.

Referring to FIG. 4, a cross section of control valve 10 is shown to illustrate the magnetic path formed by the control valve 10. As discussed above with reference to FIG. 3, the core 48, first arm 14 and second arm 16 are magnetically coupled. A magnetic circuit 50 is formed in the control valve 10. The magnetic circuit 50 includes the first arm 14 coupled to the core 48 coupled to the second arm 16 and then coupled to the MRF 52 coupled to the inner rod 40 and to the first arm 14. FIG. 4 illustrates the lines of magnetic flux 54 in the magnetic circuit 50. The magnetic flux 54 flows through the magnetic circuit 50 along the path of the components. The magnetic flux 50 flows from the second arm 16 through the MRF 52 in the annular region 36 to the inner rod 40. The magnetic flux 54 is perpendicular to the annular region 36 as well as continuous along the entire length. Therefore, the magnetic flux 54 is perpendicular to the fluid flow of the MRF 52 as it passes through the annular region 36. Because the magnetic flux 54 is perpendicular in the annular region 36, the magnetic field at that region is strongest, thus the effect on the MRF 52 is most effective along the entire annular region 36. The magnetic forces that can be applied to the MRF 52 to vary the flow characteristics (such as apparent viscosity) are dependent on the geometry of the annular region 36 and the effective strength and size of the magnetic field applied to the MRF 52. The distance illustrated by numeral 56 can be varied in order to alter the performance characteristics of the control valve 10. As the distance 56 changes, the annular region 36 changes and the resultant magnetic field at the annular region 36 is altered. Changes in the materials within the magnetic circuit 50 as well as the current applied to the electromagnetic coil 12 can influence the MRF 52. With reference to FIG. 5, variation of the diameters of the passage 38 and inner rod 40 can also influence the flow of MRF 52 in the annular region 36.

Figure 6:
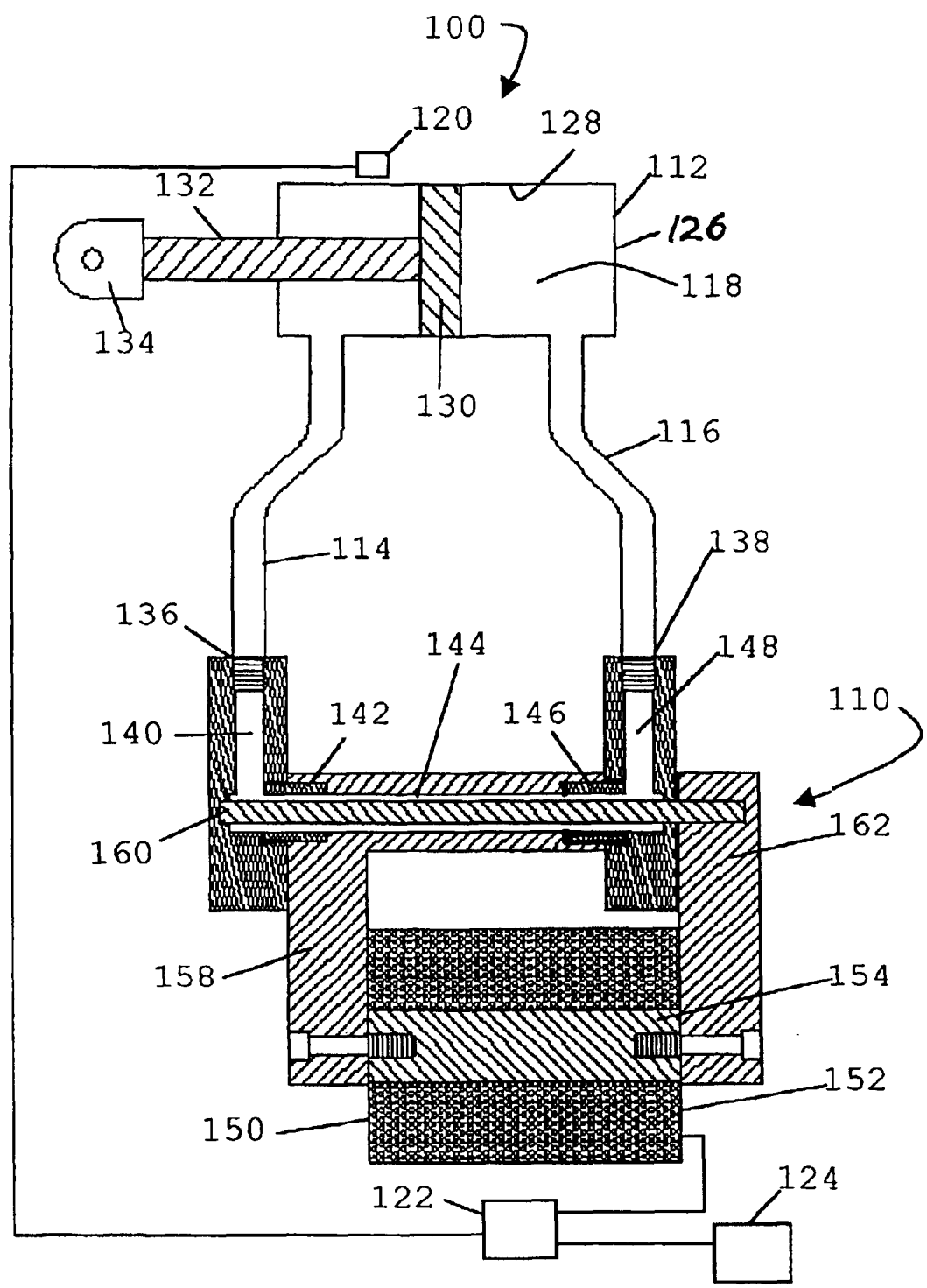
FIG. 6 is a diagram of an exemplary system employing the MRF control valve.

Referring to FIG. 6, a system diagram is illustrated with a damping system 100 including an MRF control valve 110.

The damping system 100 includes a hydraulic damper 112 coupled to the MRF control valve 110 through a first hose 114 and a second hose 116. MRF 118 is contained in and fluidly couples the hydraulic damper 112 to the MRF control valve 110 through the first and second hoses 114, 116. The damping system 100 also includes a sensor 120 in operative communication with a control unit 122. The sensor 120 senses vibration and/or relative motion within the hydraulic damper 112. The vibration and/or motion can be related to linear displacement due to earthquakes, mechanical reaction forces from vehicle suspension systems, landing gear, and the like. The control unit 122 is operatively coupled to the MFR control valve 110 externally of the MRF 118 to provide control inputs for actuation of the MRF control valve 110. There are no electrical penetrations through the working fluid boundary. A power source 124 is operatively coupled to the control unit 122 to provide electrical current to the MRF control valve 110.

The demonstrative hydraulic damper 112 includes a housing 126 containing the MRF 118 and an accumulator (not shown) to accommodate volumetric changes due to piston displacement and thermal expansion. The interior of the housing 126 defines a cylinder 128 that receives a piston 130 coupled to a rod 132 having a mating bracket 134 on an end opposite of the piston 130. The mating bracket 134 receivably couples to a structure that is to be dampened (not shown) such as a beam of a building, a chassis for a vehicle, landing gear linkages and the like. MRF 118 fluidly communicates through the first and second hoses 114, 116 into the MRF control valve 110 via the first aperture 136 and second aperture 138.

In one embodiment, MRF 118 fluidly communicates from the first hose 114 into the first bore 140 through the first aperture 136 and past the first bushing 142. The MRF 118 fluidly communicates with the annular region 144 through the second bushing 146 and into the second bore 148 and to the second aperture 138 to the second hose 116. The MRF 118 can flow in a direction from the first hose 114 through the MRF control valve 110 to the second hose 116 as well in the opposite direction.

In an exemplary embodiment, the damping system 100 operates to dampen mechanical translation generated by external vibration and/or translation of components coupled to the mating bracket 134. As the external motion is received by the mating bracket 134, the motion is translated to the rod 132 and piston 130 assembly. The piston 130 translates within the cylinder 128 and displaces MRF 118. If, for example, the piston 130 translates such that the MRF 118 is displaced within the cylinder 128 toward the first hose 114 and away from the second hose 116, the MRF 118 flows through the first hose 114 into the first aperture 136. The MRF 118 flows through the first bore 140 and past the first bushing 142 and through the annular region 144. The MRF 118 flows past the second bushing 146, second bore 148 and through the second hose 116 into the cylinder 128.

As the MRF 118 flows within the damping system 100 past the system components, fluid flow resistance (due to fluid friction forces) acts on the MRF 118. The fluid flow resistance can be characterized as passive resistance within the system 100. The passive resistance acts to dampen the translation of the rod 132 and piston 130 within the cylinder 128. As the piston 130 is translated through the MRF 118, the MRF 118 resists the translation of the piston 130 due to fluid friction within the damping system 100. The passive resistance does not rely on any active change in the MRF 118. Therefore, the MRF control valve 110 has inherent passive damping properties.

Referring to FIG. 6, the operation of the damping system 100 is further described. The MRF control valve 110 also has controllable damping properties. Due to the inherent properties of the MRF 118, exposure to magnetic fields alters the apparent viscosity of the MRF 118. When the electromagnetic coil 150 of the MRF control valve is energized with an electric current through the coil of wire 152 around the magnetic core 154 a magnetic flux (see FIG. 4) is generated within the MRF control valve 110. The magnetic flux acts on the MRF 118 and alters the apparent viscosity of the MRF 118. The apparent viscosity of the MRF 118 can be varied depending on the magnitude of the magnetic flux that passes through the MRF 118 in the MRF control valve 110. The magnetic flux is dependent upon the amount of electrical current that passes through the coil of wire 152.

Due to the arrangement of the MRF control valve 110, specifically the annular region 144, the magnetic flux can act on the MRF 118 within the annular region 144 along the entire length of the annular region 144 in a continuous manner. There are no discrete sections of magnetic flux across the MRF 118 within the MRF control valve 110. The magnetic flux can flow through the MRF control valve 110 from the magnetic core 154 to the second arm 158 through the MRF 118 and to the inner rod 160 to the first arm 162 back to the magnetic core 154. The polarity of the electric current flowing through the coil of wire 152 can be reversed such that the magnetic flux flows in a direction from the magnetic core 154 to the first arm 162 to the inner rod 160 through the MRF 118 and into the second arm 158 and back to the magnetic core 154. The magnetic flux will flow perpendicular to the long axis of the inner rod 160 and annular region 144.

The MRF control valve 110 is capable of providing both passive damping as well as controllable damping within the damping system 100. The ratio of passive damping to controllable damping can be varied depending on the requirements of the damping system 100. The MRF control valve 110 can be geometrically varied to provide greater and lesser passive as well as controllable damping. For example, the annular region 144 can be lengthened thereby increasing the magnetic flux across the MRF 118, thus, increasing the potential for controllable damping. The increase in length also increases the flow resistance within the annular region 144, thus increasing the passive damping. The diameter of the annular region 144 can be increased to allow for larger mass flow rates through the MRF control valve 110, thus larger hydraulic dampers 112 can be accommodated. Since the controllable damping is directly related to the amount of current flowing through the electromagnetic coil 150. By varying the current through the electromagnetic coil 150, the active damping can be varied. By altering the current through the electromagnetic coil 150, the MRF control valve can be fitted to a wide range of damping systems 100 and provide active and passive damping without the need to alter the geometry of the MRF control valve. The MRF control valve 110 is versatile.

Figure 7:
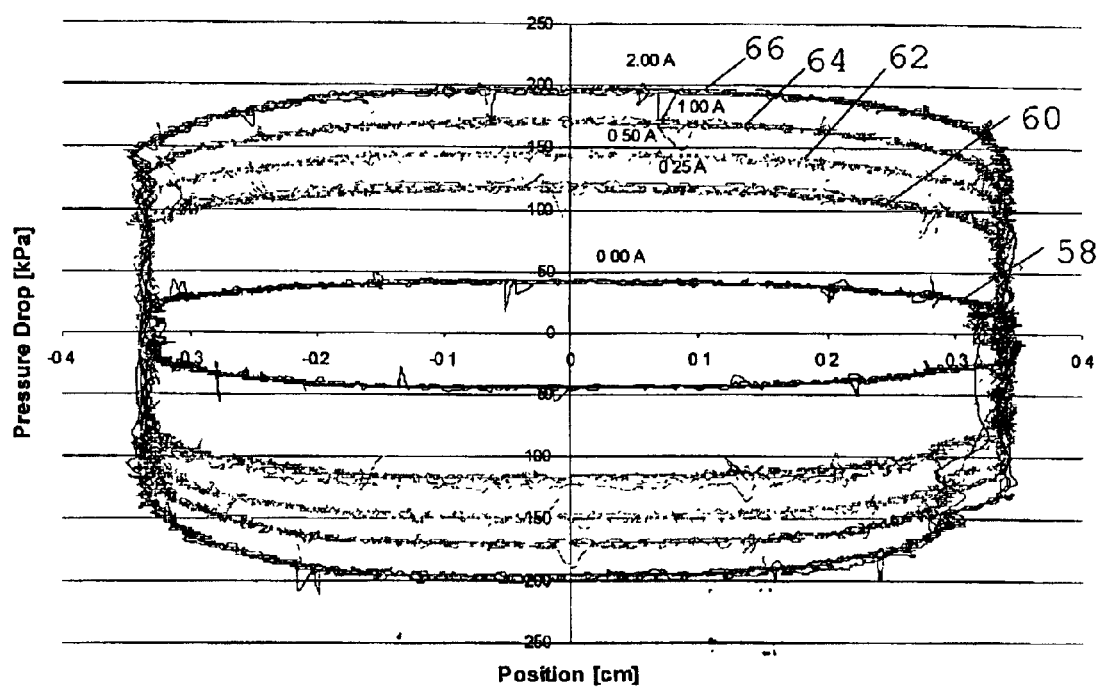
FIG. 7 is a graphical representation of experimental pressure drop versus position results for tests of an exemplary embodiment at different input currents.

Referring to FIG. 7, a graphical representation of experimental pressure drop versus position is illustrated. The FIG. 7 presents typical input electromagnetic coil current comparative experimental results for pressure drop across the MRF valve versus position of a piston-cylinder source, which provides the externally driven harmonic flow. Pressure drop is shown on the "Y" axis and the position of a piston-cylinder source is shown on the "X" axis at different input currents. Numeral 58 represents the input current at 0.00 Amp, 60 is 0.25 Amp, 62 is 0.50 Amp, 64 is 1.00 Amp and 66 represents an input current value of 2.00 Amps.

Figure 8:
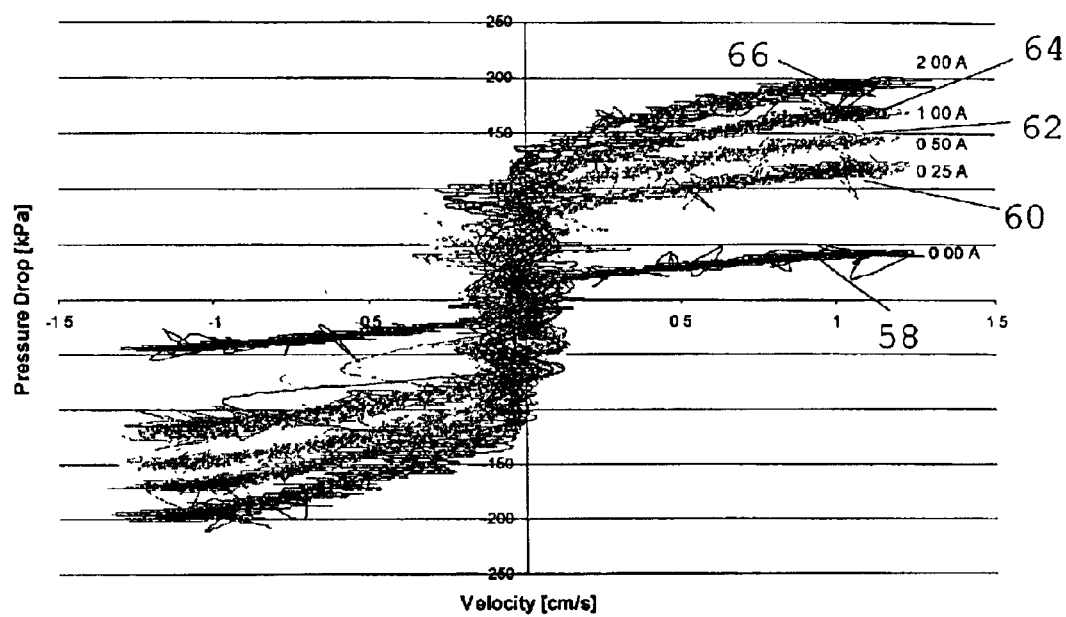
FIG. 8 is a graphical representation of experimental pressure drop versus velocity results for tests of an exemplary embodiment at different input currents.

Referring to FIG. 8, a graphical representation of experimental results for pressure drop across the MRF valve versus velocity of the external hydraulic source provided by a reciprocating piston-cylinder is illustrated. Pressure drop in kilo Pascals (kPa) is shown on the "Y" axis and the velocity in centimeters per second (cm/s) of the piston-cylinder is shown on the "X" axis at different input currents. Numeral 58 represents the input current at 0.00 Amp, 60 is 0.25 Amp, 62 is 0.50 Amp, 64 is 1.00 Amp and 66 represents an input current value of 2.00 Amps.

The configuration of the MRF control valve promotes magnetic flux across the entire length of the annular region. The MRF control valve can have a very long annular flow region length. The longer the annular region of the MRF control valve, the greater the MRF dynamic force range. The MRF control valve does not rely on any mechanical moving parts and manufacturing tolerances. The length and diameter of the annular region within the valve, as well as the diameter of the valve's flow region and material properties of all the parts used in the proposed device can be varied to obtain the desired damping force. The annular region of embodiments of the MRF valve relies on the unique magnetic circuit embodied in the MRF control valve. The magnetic circuit is completed through the MRF fluid in the annular region. Results indicate that the configuration promotes an efficient magnetic circuit. The annular region can be designed so that a baseline viscous pressure drop is inherent in the valve region. When the MRF valve is used in a damper application, it will have a fail-safe characteristic. A fail-safe damper is defined as a damper, which retains a damping capacity despite power supply and/or controller failure. The viscous passive portion of the damping force can be minimized to a very small force (about zero), if needed for a specific damping system application. A fail-safe characteristic is important when electrical system failure will not result in damper failure. Without electrical input, the MRF valve will function as a passive damper.

The invention presented offers the following benefits that enhance the current state-of-the-art in the field of MRF valve technology including: an efficient magnetic circuit through the described annular region; that is perpendicular to the flow direction for the entire length of the valve; simple geometric configuration that does not rely on any moving part; and a fail-safe valve when used in a damper (or actuator) application where in the case of an electrical system failure the MRF damping system will still function at a certain passive state.

The MRF valve can be incorporated into hydraulic fluid applications via an external, or internal, flow control valve. The proposed MRF valve can be used in retrofit damper applications where a standard hydraulic piston cylinder can be converted into a damper by the simple external installation. The disclosed device can be built at any length and developed for applications in vehicle suspension, aerospace landing gear, and other damped hydraulic systems. The disclosed device can be implemented singularly or in a multiple configuration of valves in series or parallel to accommodate various flow rates. The simplicity of the MRF valve devices offer flow control without mechanically complex moving parts, which are vulnerable to possible wear induced failure and external mechanical system malfunction.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A magnetorheological fluid control valve comprising:
    an electromagnetic coil having a first end and a second end;
    a first arm magnetically coupled to the first end of said electromagnetic coil;
    a second arm magnetically coupled to the second end of said electromagnetic coil, said second arm having a passage;
    a ferromagnetic rod having a diameter less than that of said passage disposed in said passage and magnetically coupled to said first and second arms;
    a first manifold coupled to said second arm at one end of said passage;
    a second manifold coupled between said second arm and said first arm at an end of said passage opposite said first manifold;
    a magnetorheological fluid disposed in said passage.

2. The magnetorheological fluid control valve of claim 1 further comprising:
    an electromagnetic circuit, said electromagnetic circuit having no electrical penetrations through said magnetorheological fluid disposed in said passage.

3. The magnetorheological fluid control valve of claim 1 wherein said electromagnetic coil and said first arm are integral.

4. The magnetorheological fluid control valve of claim 1 wherein said first arm and said second arm are formed of a ferromagnetic material.

5. The magnetorheological fluid control valve of claim 1 wherein said first and second manifold are formed of a non-ferromagnetic material.

6. The magnetorheological fluid control valve of claim 1 further comprising:
    a first bushing coupled between said first manifold and said second arm; and
    a second bushing coupled between said second manifold and said second arm opposite said first bushing.

7. The magnetorheological fluid control valve of claim 6 wherein said first bushing fluidly seals between said first manifold and said passage and said second bushing fluidly seals between said second manifold and said passage.

8. The magnetorheological fluid control valve of claim 1 wherein said passage is configured such that said magnetorheological said disposed in said passage flows from said first manifold to said second manifold.

9. The magnetorheological fluid control valve of claim 1 wherein said passage is configured such that said magnetorheological fluid disposed in said passage flows from said second manifold to said first manifold.

10. The magnetorheological fluid control valve of claim 1 wherein said ferromagnetic rod and said passage are configured to form an annular region, said magnetorheological fluid being disposed in said annular region.

11. The magnetorheological fluid control valve of claim 10 wherein a magnetic flux flows continuously along said annular region and perpendicular to said annular region.

12. The magnetorheological fluid control valve of claim 1 wherein said ferromagnetic rod and said passage can be geometrically altered to vary flow characteristics.

13. The magnetorheological fluid control valve of claim 1 wherein a magnetic field formed between said ferromagnetic rod and said passage can be altered to vary flow characteristics.

14. The magnetorheological fluid control valve of claim 1 wherein said electromagnetic coil includes a reversible polarity.

15. The magnetorheological fluid control valve of claim 1 wherein said magnetorheological fluid disposed in said passage is both passively damped and controllably damped.

16. A magnetorheological fluid control valve comprising:
    an electro-magnet wound on a ferromagnetic core;
    a first magnet-support member formed from a ferromagnetic material in contact with and fastened to a first end of said ferromagnetic core;
    a second magnet-support member formed from a ferromagnetic material in contact with and fastened to a second end of said ferromagnetic core, said second magnet-support member including a duct formed therethrough;
    a first manifold formed from a non-ferromagnetic material having a fluid coupling at a first end thereof, said first manifold having a second end communicating with a first end of said duct;
    a second manifold formed from a non-ferromagnetic material having a fluid coupling at a first end thereof, said second manifold having second end communicating with a second end of said duct;
    a rod formed from a ferromagnetic material and disposed within said duct, said rod supported at a first end by said first manifold, said rod extending through said second manifold and in contact with and supported at a second end by said first magnet-support member such that a magnetic gap is formed between said rod and an inner wall of said second magnet support member defining said duct; and
    said first manifold, said duct and said second manifold forming a fluid-tight passage for said magnetorheological fluid.

17. The magnetorheological fluid control valve coupling of claim 16 wherein said second end of said first and second manifolds are coupled to said duct in said second magnet-support member through fluid tight bushings.

18. The magnetorheological fluid control valve coupling claim 16 wherein said second magnet-support member is substantially L-shaped, and comprises a first branch in contact with and fastened to said second end of said ferromagnetic core, and a second branch in which said duct is longitudinally disposed.

* * * * *